US009081901B2

(12) United States Patent  
Lewins et al.

(10) Patent No.: US 9,081,901 B2  
(45) Date of Patent: Jul. 14, 2015

(54) MEANS OF CONTROL FOR RECONFIGURABLE COMPUTERS

(75) Inventors: Lloyd J. Lewins, Marina Del Rey, CA (US); William D. Farwell, Thousand Oaks, CA (US); Kenneth E. Prager, Granite Bay, CA (US); Michael D. Vahey, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 331 days.

(21) Appl. No.: 11/981,161

(22) Filed: Oct. 31, 2007

(65) Prior Publication Data

US 2009/0113083 A1 Apr. 30, 2009

(51) Int. Cl.
*G06F 3/00* (2006.01)
*G06F 13/38* (2006.01)

(52) U.S. Cl.
CPC ........... *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 5,347,639 A * | 9/1994 | Rechtschaffen et al. | 712/203 |
| 5,448,496 A * | 9/1995 | Butts et al. | 716/116 |
| 5,623,628 A * | 4/1997 | Brayton et al. | 711/141 |
| 5,936,953 A * | 8/1999 | Simmons | 370/364 |
| 5,937,202 A * | 8/1999 | Crosetto | 712/19 |
| 6,081,865 A * | 6/2000 | Tavallaei et al. | 710/309 |
| 6,088,751 A * | 7/2000 | Jaramillo | 710/116 |
| 6,122,715 A * | 9/2000 | Palanca et al. | 711/154 |
| 6,195,788 B1 * | 2/2001 | Leaver et al. | 716/116 |
| 6,216,215 B1 * | 4/2001 | Palanca et al. | 712/23 |
| 6,356,270 B2 * | 3/2002 | Pentkovski et al. | 345/530 |
| 6,370,148 B1 * | 4/2002 | Calvignac et al. | 370/412 |
| 6,393,021 B1 * | 5/2002 | Chow et al. | 370/378 |
| 6,728,871 B1 * | 4/2004 | Vorbach et al. | 712/226 |
| 6,883,084 B1 * | 4/2005 | Donohoe | 712/1 |
| 6,988,154 B2 * | 1/2006 | Latta | 710/240 |
| 7,051,133 B2 * | 5/2006 | Takata | 710/111 |
| 7,076,416 B2 * | 7/2006 | Chen et al. | 703/15 |
| 7,272,027 B2 * | 9/2007 | Pereira et al. | 365/49.1 |
| 7,305,635 B1 * | 12/2007 | Abramovici et al. | 716/136 |
| 7,373,440 B2 * | 5/2008 | Huppenthal et al. | 710/72 |
| 7,385,972 B2 * | 6/2008 | Black et al. | 370/389 |
| 7,394,284 B2 * | 7/2008 | Vorbach | 326/38 |
| 7,427,871 B2 * | 9/2008 | Kelem et al. | 326/9 |
| 7,529,291 B2 * | 5/2009 | Dutka | 375/149 |
| 7,565,525 B2 * | 7/2009 | Vorbach et al. | 713/100 |
| 7,958,096 B2 * | 6/2011 | Perrizo | 707/693 |

(Continued)

*Primary Examiner* — Ilwoo Park
*Assistant Examiner* — Christopher Bartels
(74) *Attorney, Agent, or Firm* — Christie, Parker & Hale, LLP

(57) ABSTRACT

A data flow controller for reconfigurable computers. The novel data flow controller includes a first circuit for selecting one of a plurality of operating conditions and a second circuit for determining if the selected condition is met and outputting a control signal accordingly. In an illustrative embodiment, the operating conditions include: when all enabled data available signals are asserted and all enabled space available signals are asserted; when any enabled data available signal is asserted and all enabled space available signals are asserted; when all enabled data available signals are asserted and any enabled space available signal is asserted; and when any enabled data available signal is asserted and any enabled space available signal is asserted. By allowing a configurable element to operate under different possible conditions, data flow signals can also then be used to control what operation the element performs, in addition to controlling when.

25 Claims, 5 Drawing Sheets

(56) References Cited

U.S. PATENT DOCUMENTS

| | | | |
|---|---|---|---|
| 8,018,249 B2* | 9/2011 | Koch et al. | 326/41 |
| 8,402,449 B1* | 3/2013 | Biswas et al. | 717/146 |
| 2001/0039624 A1* | 11/2001 | Kellum | 713/201 |
| 2002/0012340 A1* | 1/2002 | Kalkunte et al. | 370/360 |
| 2002/0157066 A1* | 10/2002 | Marshall et al. | 716/1 |
| 2003/0035375 A1* | 2/2003 | Freeman | 370/238 |
| 2003/0046596 A1* | 3/2003 | Floyd et al. | 713/400 |
| 2003/0146073 A1* | 8/2003 | Cummings et al. | 200/1 R |
| 2003/0231630 A1* | 12/2003 | Messenger | 370/392 |
| 2005/0044344 A1* | 2/2005 | Stevens | 712/227 |
| 2005/0050105 A1* | 3/2005 | Idicula et al. | 707/200 |
| 2005/0144210 A1* | 6/2005 | Simkins et al. | 708/490 |
| 2006/0015703 A1* | 1/2006 | Ramchandran et al. | 712/34 |
| 2006/0075211 A1* | 4/2006 | Vorbach | 712/221 |
| 2006/0095894 A1* | 5/2006 | Wilde et al. | 717/113 |
| 2006/0167917 A1* | 7/2006 | Solomon | 707/101 |
| 2006/0179182 A1* | 8/2006 | Chadha et al. | 710/29 |
| 2006/0277391 A1* | 12/2006 | Bittner, Jr. | 712/25 |
| 2006/0294483 A1* | 12/2006 | Mukund et al. | 716/7 |
| 2007/0028039 A1* | 2/2007 | Gupta et al. | 711/108 |
| 2007/0150637 A1* | 6/2007 | Vorbach | 710/309 |
| 2007/0214342 A1* | 9/2007 | Newburn et al. | 712/216 |
| 2007/0220367 A1* | 9/2007 | Smith et al. | 714/48 |
| 2007/0260771 A1* | 11/2007 | Lee et al. | 710/29 |
| 2007/0294511 A1* | 12/2007 | Ramchandran et al. | 712/34 |
| 2007/0294666 A1* | 12/2007 | Papakipos et al. | 717/119 |
| 2009/0063823 A1* | 3/2009 | Burky et al. | 712/216 |
| 2009/0113375 A1* | 4/2009 | Jeong et al. | 716/18 |
| 2009/0278564 A1* | 11/2009 | Dehon et al. | 326/9 |

* cited by examiner

MEANS OF CONTROL FOR RECONFIGURABLE COMPUTERS

BACKGROUND OF THE INVENTION

1. Field of the Invention

The present invention relates to computer architectures. More specifically, the present invention relates to reconfigurable computer architectures.

2. Description of the Related Art

Most processing applications are currently performed using a software implementation on a fixed hardware architecture, which is designed to execute a particular class of software. Alternatively, many applications may be implemented by designing hardware to execute only the algorithms required. Such dedicated hardware can typically execute a given algorithm 2-3 orders of magnitude more efficiently than software, in terms of speed, power, and size. Unfortunately, dedicated hardware is inflexible and cannot easily be changed to perform functions other than those for which it was originally designed. Accordingly, reconfigurable computers have been developed as a compromise between the processing efficiencies afforded by dedicated hardware and the flexibility afforded by software.

The reconfigurable computer (RC) is a digital device whose internal circuits may be programmably re-wired in order to implement various functions. Because the desired functions are directly implemented in logic, the RC can be 10 to 100 times more efficient (in speed, power, and density) than conventional general-purpose computers. A problem with the RC is that programming can be difficult and limited in flexibility.

In the prior art, there have been a number of variations on the RC to enhance capability and programming. First, there was an evolution from fine-grained logic elements (i.e., gates) to coarse-grained functional elements (i.e., arithmetic functions). Second, route timing between elements was made deterministic, independent of program. Third, data flow architectures provided automatic alignment of operands. However, what are needed are better methods for dynamic decision making during processing.

A reconfigurable computer typically includes a multiplicity of operational elements (such as arithmetic/logic units, processors, memory, etc.) and a programmable interconnection network for connecting the elements in accordance with user-defined configuration settings.

An important type of RC uses a distributed control, data flow architecture. In accordance with conventional teachings, the data flow control logic is restricted to a single type of logical function. That is, an element performs an operation if and only if all selected input sources are available and all selected output sources are available. This type of control system works well for many applications, but there are some applications that could be more advantageously implemented using different forms of data flow control. An example application is where there are multiple data sources and it is desirable to operate on the first data signal that appears. In this case, it would be more efficient to have the data flow logic to be such that the element performs an operation if any selected input source is available (and all the selected output sources are available).

Hence, a need exists in the art for an improved data flow control logic for reconfigurable computers offering more flexibility than conventional approaches.

Further, for many applications it is necessary to have another degree of control. That is, the ability to dynamically switch the RC interconnection network on a sample-by-sample basis, responsive to the control bits and control states that occur at each sample. In accordance with conventional teachings, dynamic switching may be accomplished by making the programmable interconnect network to be dynamic. This has the disadvantage that a large, dynamically switched network is complex and costly to implement, in terms of chip size, power, and speed. (Since an RC should have a large number of elements, the interconnection network is necessarily large and thus difficult for a completely dynamic implementation.)

Alternatively, conventional teaching provides that the interconnection network be static, and that dynamic switching be done by individual elements, in addition to their primary operations. For example, an arithmetic logic unit (ALU) functional element may include a dynamic switch at its input, selecting any of 4 input ports as its two input operands. Thus dynamic switching of operand sources can be done from a limited selection. Also, by using the ALU pass-through modes, a standalone, 4 to 1 multiplex switch can be configured. This approach has the disadvantage of inefficiency: all of the functional elements carry the overhead of switching, even though only a few would typically be used for dynamic switching. (The inefficiency is manifest primarily in the interconnection network, because there are now many more ports to be connected.) Another disadvantage is that in order to configure various types of dynamic switching, many functional elements may be needed, and they are thus unavailable for their primary function. As an example, to build a 4×4 dynamic crossbar would use four of the aforementioned ALU elements, devoted solely to switching.

Therefore, a need exists in the art for an improved method for providing dynamic switching in reconfigurable computers that is more efficient than conventional approaches.

SUMMARY OF THE INVENTION

The need in the art is addressed by the data flow controller for reconfigurable computers of the present invention. The novel data flow controller includes a first circuit for selecting one of a plurality of operating conditions and a second circuit for determining if the selected condition is met and outputting a control signal accordingly: In an illustrative embodiment, the operating conditions include: when all enabled data available signals are asserted and all enabled space available signals are asserted; when any enabled data available signal is asserted and all enabled space available signals are asserted; when all enabled data available signals are asserted and any enabled space available signal is asserted; and when any enabled data available signal is asserted and any enabled space available signal is asserted. By allowing a configurable element to operate under different possible conditions, data flow signals can also then be used to control what operation the element performs, in addition to controlling when. The present teachings also provide a novel method for dynamic switching in reconfigurable computers by introducing a dynamic switch element whose sole purpose is dynamic switching and flow control.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
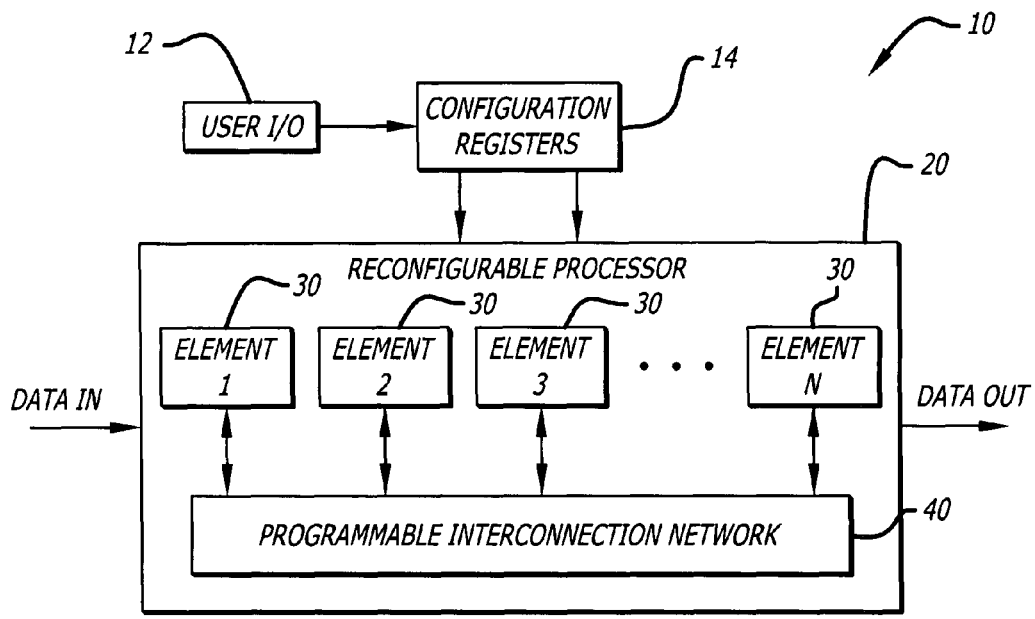
FIG. 1 is a simplified block diagram of an illustrative reconfigurable computer system implemented in accordance with the teachings of the present invention.

FIG. 1 is a simplified block diagram of an illustrative reconfigurable computer system 10 implemented in accordance with the teachings of the present invention. The reconfigurable computer 10 includes a user interface 12 that provides data to configuration registers 14. The registers 14 serve to configure a reconfigurable processor 20, which includes a multiplicity of programmably interconnected elements 30 and a programmable interconnection network 40.

The programmable interconnection network 40 connects the elements 30 in accordance with configuration settings stored in the configuration registers 14. The programmable interconnection network 40 can be implemented in a variety of ways; for example, as a large crossbar switch, as hierarchical crossbar switches, or with multiple, multi-user busses.

Each element 30 includes an operational element and its associated control circuits. The operational elements can be homogeneous (all the same) or heterogeneous (a multiplicity of different element types, each performing different kinds of operations). Example element types include (but are not limited to) multipliers, arithmetic/logic units (ALUs), accumulators, memory controllers, memory, or even complete microprocessors. Note that an element can typically perform more than one operation (i.e., an ALU can add, subtract, pass data, or perform logical operations).

In accordance with the present teachings, each element 30 includes a novel data flow control architecture discussed more fully below with reference to FIGS. 4-8.

Figure 2:
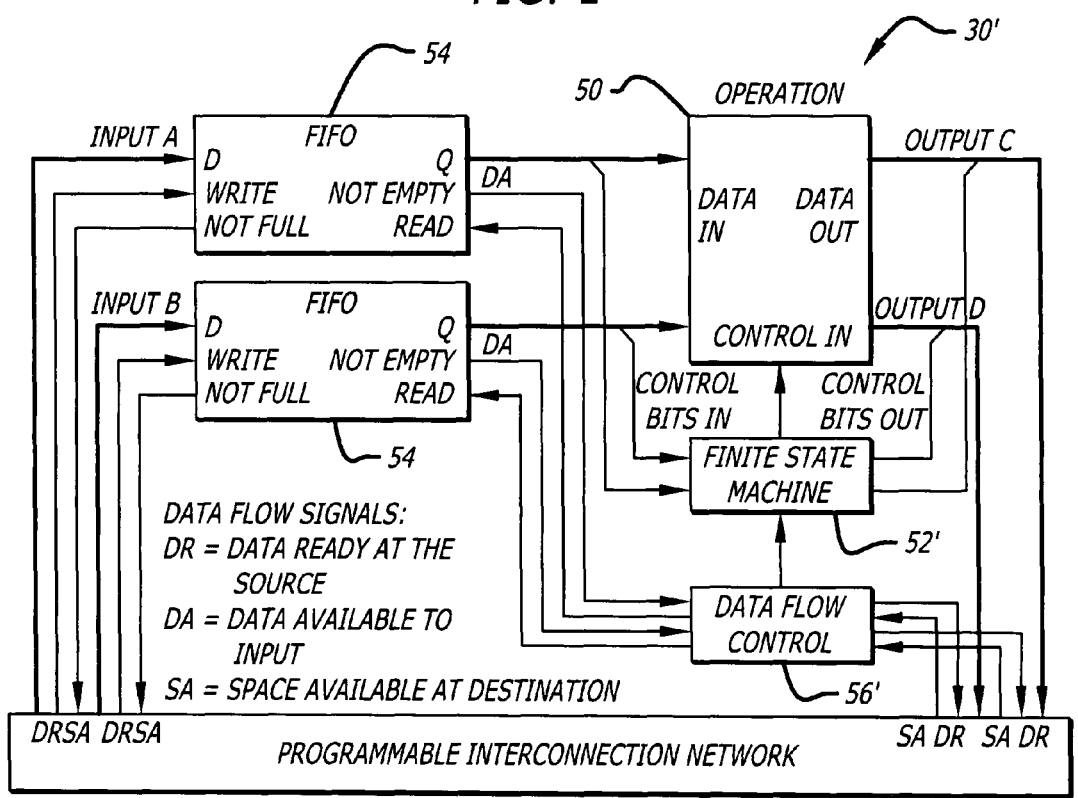
FIG. 2 is a simplified block diagram of an illustrative example of a configurable element using a conventional distributed control, data flow architecture.

FIG. 2 is a simplified block diagram of an illustrative example of a configurable element 30' using a conventional distributed control, data flow architecture. The illustrative element 30' includes an operational element 50 controlled by a finite state machine (FSM) 52', and a FIFO (first in, first out) register 54 at each input to the element 50 (two inputs A and B are shown in FIG. 2). Data flow control logic 56', responsive to data available (DA) signals from the FIFOs 54 and space available signals from the programmable interconnection network 40, outputs a control signal to the FSM 52'.

A reconfigurable computer can be set set-up, or configured, to efficiently perform a number of different functions. Configuration typically includes the following steps:
1) setting a specific pattern of interconnection between the elements;
2) defining the sequence and coordination of operations among the various elements; and
3) defining the operation of each element, at each point in the processing sequence.

In a conventional distributed control, data flow architecture, the configuration steps above are accomplished as follows:
1) Interconnections between elements are set statically, with controls in program registers.
2) The sequence of operations follows data flow (DF) protocols. That is, an operation is performed at a functional element if and only if valid data are available from all selected sources (as indicated by data available signals, DA), and space is available at all selected destinations (e.g., destinations are ready to accept new input, as indicated by source available signals, SA). DF simplifies programming, since sequencing of operations occurs automatically, based on the topology set by the interconnections.
3) Distributed control for element operation. That is, there is a finite state machine controller at each element that, after each operation, defines the subsequent operation. The FSM is responsive to control bits that accompany, and are routed with, the data. At each element, the FSM state table may be programmably defined at configuration. Distributed control is advantageous because it eliminates the need for a dynamic programming network that would need to be synchronized with the data flow.

In accordance with conventional teachings, the data flow control logic 56' is restricted to a single type of logical function. Operation occurs if and only if all the selected DA signals are asserted and all the selected SA signals are asserted. As discussed above, some applications could be more advantageously implemented if different forms of data flow control were available.

The novel data flow control approach of the present invention provides an expanded set of data flow control logic types, any of which may be selected upon configuration. In an illustrative implementation, the invention provides for four types of data flow control logic. Each of these provides different, unique conditions that determine when an operation occurs, as follows:
1) if all selected DA signals are asserted and all the selected SA signals are asserted;
2) if any selected DA signal is asserted and all the selected SA signals are asserted;
3) if all selected DA signals are asserted and any selected SA signal is asserted; and
4) if any selected DA signal is asserted and any selected SA signal is asserted.

FIGS. 3-6 show illustrative control circuits for each of the control types 1-4, respectively. For simplicity, the illustrative examples show control logic for an element with two destination data paths and two source data paths. However, elements may have more or less destination and source data paths without departing from the present teachings. The associated control equations are general, for i destinations and j sources, with the following definitions:

SA(i)=Space Available at downstream destination, i=0 to N−1 destinations

DA(j)=Data Available from upstream source FIFO, j=0 to M−1 sources $Enable_{OUT}(i)$=Destination select from the local finite state machine (FSM)

$Enable_{IN}(j)$=Source select from the local FSM

Figure 3:
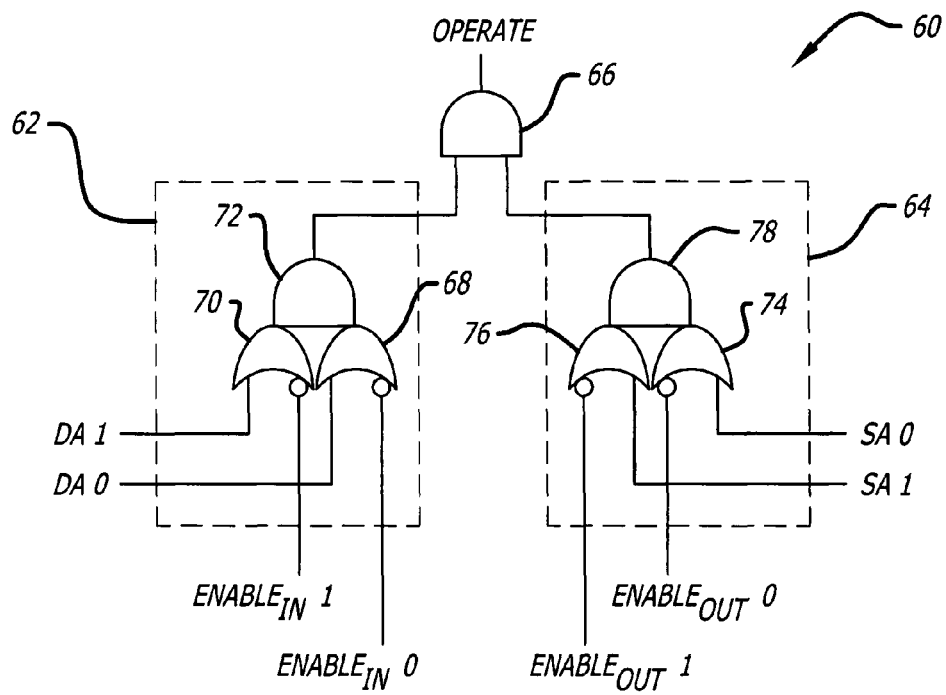
FIG. 3 is a simplified schematic of an illustrative control circuit implementing a first (conventional) control type: when all selected DA signals are asserted and all selected SA signals are asserted.

FIG. 3 is a simplified schematic of an illustrative control circuit 60 implementing the first control type: when all selected DA signals are asserted and all selected SA signals are asserted. Note that this is the only control type available in conventional approaches. As shown in the example of FIG. 3, the circuit 60 includes a first circuit 62 for determining if all selected DA signals are asserted, a second circuit 64 for determining if all selected SA signals are asserted, and an AND gate 66 operating on the outputs of the first and second circuits 62 and 64. The output of the AND gate 66 is the output of the control circuit 60, which is subsequently output to the FSM to control when an operation should be performed.

In the illustrative example (for two data sources and two destinations), the first circuit 62 is implemented using two OR gates 68 and 70, each OR gate 68 and 70 adapted to receive as its inputs a data available signal, DA(j), and the complement of a corresponding enable source signal, $NOT[Enable_{IN}(j)]$, for j=0 and 1, respectively. The outputs of the OR gates 68 and 70 are input to an AND gate 72, the output of which is the output of the circuit 62.

The second circuit 64 is implemented using two OR gates 74 and 76, each OR gate 74 and 76 adapted to receive as its inputs a source available signal, SA(i), and the complement of a corresponding enable destination signal, $NOT[Enable_{OUT}(i)]$, for i=0 and 1, respectively. The outputs of the OR gates 74 and 76 are input to an AND gate 78, the output of which is the output of the circuit 64.

In general, a Type 1 control circuit implements the following equation:

$$\text{Operate}=\Pi[(DA(j)+!Enable_{IN}(j)) \,\&\, (SA(i)+!Enable_{OUT}(i))] \quad [1]$$

where !Enable represents the logic function NOT[Enable].

Figure 4:
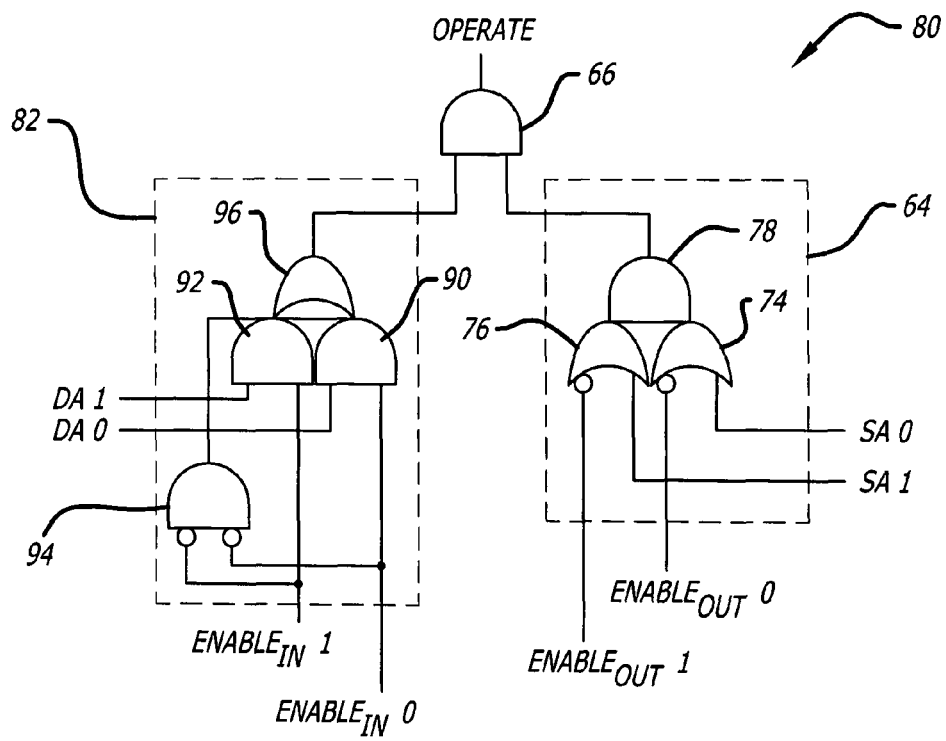
FIG. 4 is a simplified schematic of an illustrative control circuit designed in accordance with the present teachings, implementing a second control type: when any selected DA signal is asserted and all selected SA signals are asserted.

FIG. 4 is a simplified schematic of an illustrative control circuit 80 designed in accordance with the present teachings, implementing the second control type: when any selected DA signal is asserted and all selected SA signals are asserted. As shown in the example of FIG. 4, the circuit 80 includes a first circuit 82 for determining if any selected DA signal is asserted, a second circuit 64 for determining if all selected SA signals are asserted, and an AND gate 66 operating on the outputs of the first and second circuits 82 and 64. The output of the AND gate 66 is the output of the control circuit 80, which is subsequently output to the FSM to control when an operation should be performed.

The first circuit 82 is implemented using two AND gates 90 and 92, each AND gate 90 and 92 adapted to receive as its inputs a data available signal, DA(j), and a corresponding enable source signal, $Enable_{IN}(j)$, for j=0 and 1, respectively. A NOR gate 94 receives the two enable source signals, $Enable_{IN}(0)$ and $Enable_{IN}(1)$, and the output of the NOR gate 94 and the AND gates 90 and 92 are input to an OR gate 96, the output of which is the output of the circuit 82.

The second circuit 64 includes two OR gates 74 and 76, each OR gate 74 and 76 adapted to receive as its inputs a source available signal, SA(i), and the complement of a corresponding enable destination signal, $NOT[Enable_{OUT}(i)]$, for i=0 and 1, respectively. The outputs of the OR gates 74 and 76 are input to an AND gate 78, the output of which is the output of the circuit 64.

In general, a Type 2 control circuit designed in accordance with the present teachings implements the following equation:

$$\text{Operate}=\Sigma[(DA(j) \,\&\, Enable_{IN}(j)) \,\&\, \Pi(SA(i)+!Enable_{OUT}(i))] \quad [2]$$

Figure 5:
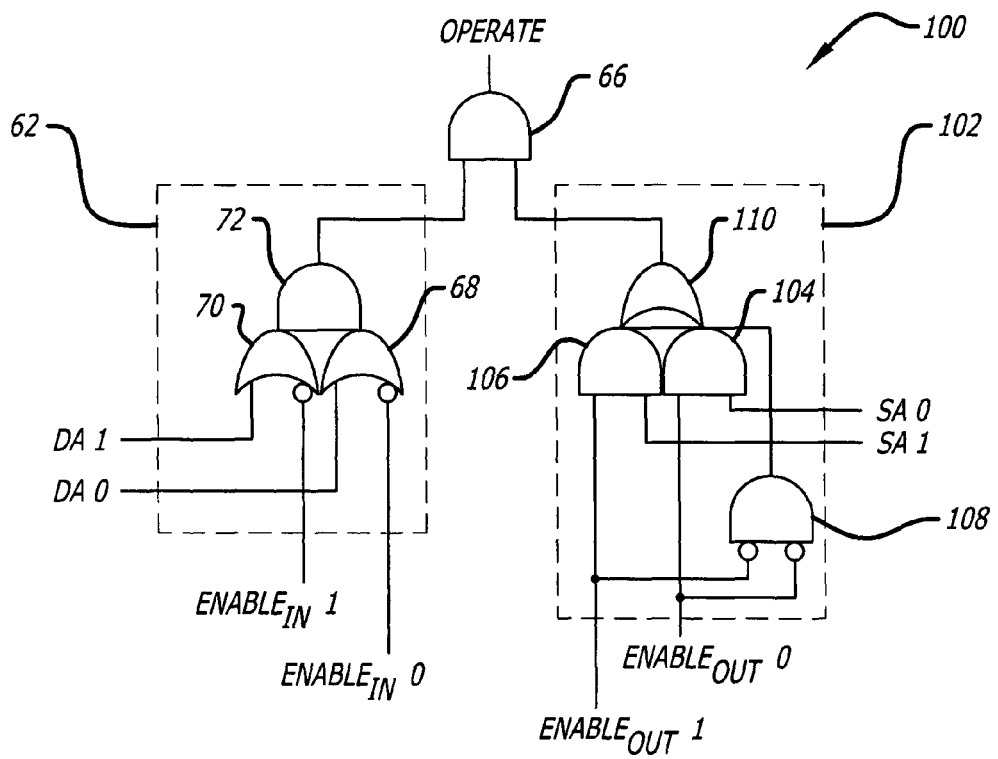
FIG. 5 is a simplified schematic of an illustrative control circuit designed in accordance with the present teachings, implementing a third control type: when all selected DA signals are asserted and any selected SA signal is asserted.

FIG. 5 is a simplified schematic of an illustrative control circuit 100 designed in accordance with the present teachings, implementing the third control type: when all selected DA signals are asserted and any selected SA signal is asserted. As shown in the example of FIG. 5, the circuit 100 includes a first circuit 62 for determining if all selected DA signals are asserted, a second circuit 102 for determining if any selected SA signal is asserted, and an AND gate 66 operating on the outputs of the first and second circuits 62 and 102. The output of the AND gate 66 is the output of the control circuit 100, which is subsequently output to the FSM to control when an 20 operation should be performed.

The first circuit 62 includes two OR gates 68 and 70, each OR gate 68 and 70 adapted to receive as its inputs a data available signal, DA(j), and the complement of a corresponding enable source signal, $NOT[Enable_{IN}(j)]$, for j=0 and 1, respectively. The outputs of the OR gates 68 and 70 are input to an AND gate 72, the output of which is the output of the circuit 62.

The second circuit 102 includes two AND gates 104 and 106, each AND gate 104 and 106 adapted to receive as its inputs a source available signal, SA(i), and a corresponding enable destination signal, $Enable_{OUT}(i)$, for i=0 and 1, respectively. A NOR gate 108 receives the two enable destination signals, $Enable_{OUT}(0)$ and $Enable_{OUT}(1)$, and the output of the NOR gate 108 and the AND gates 104 and 106 are input to an OR gate 110, the output of which is the output of the circuit 102.

In general, a Type 3 control circuit designed in accordance with the present teachings implements the following equation:

$$\text{Operate}=\Pi[(DA(j)+!Enable_{IN}(j)) \,\&\, \Sigma(SA(i)+Enable_{OUT}(i))] \quad [3]$$

Figure 6:
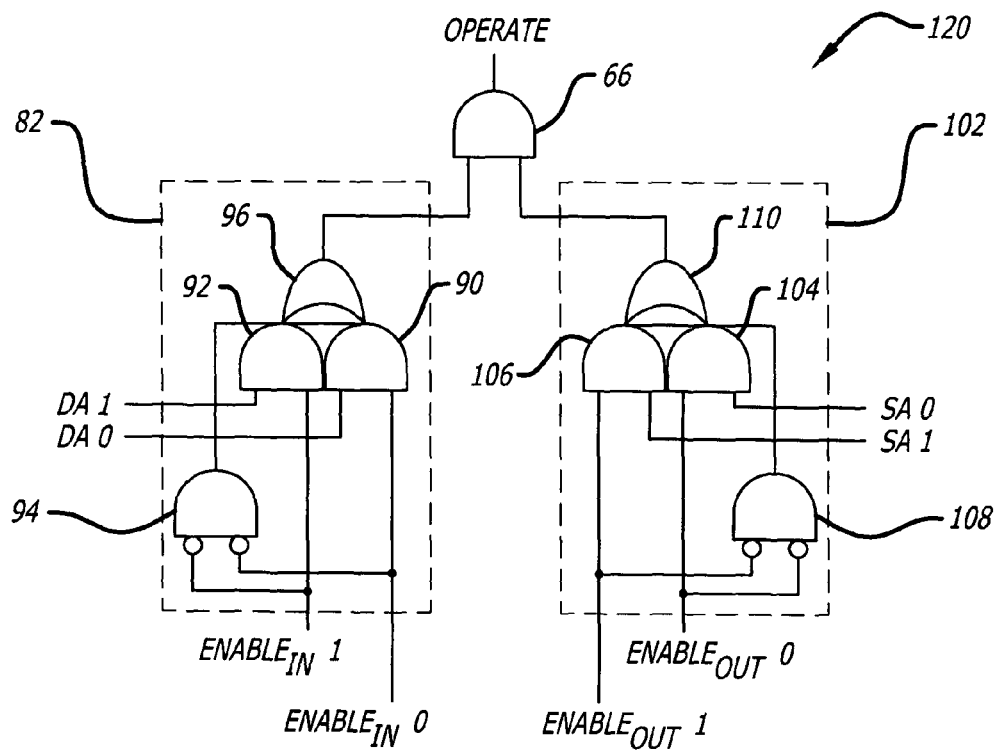
FIG. 6 is a simplified schematic of an illustrative control circuit designed in accordance with the present teachings, implementing the fourth control type: when any selected DA signals is asserted and any selected SA signal is asserted.

FIG. 6 is a simplified schematic of an illustrative control circuit 120 designed in accordance with the present teachings, implementing the fourth control type: when any selected DA signals is asserted and any selected SA signal is asserted. As shown in the example of FIG. 6, the circuit 120 includes a first circuit 82 for determining if any selected DA signal is asserted, a second circuit 102 for determining if any selected SA signal is asserted, and an AND gate 66 operating on the outputs of the first and second circuits 82 and 102. The output of the AND gate 66 is the output of the control circuit 120, which is subsequently output to the FSM to control when an operation should be performed.

The first circuit 82 is implemented using two AND gates 90 and 92, each AND gate 90 and 92 adapted to receive as its inputs a data available signal, DA(j), and a corresponding enable source signal, $Enable_{IN}(j)$, for j=0 and 1, respectively. A NOR gate 94 receives the two enable source signals, $Enable_{IN}(0)$ and $Enable_{IN}(1)$, and the output of the NOR gate 94 and the AND gates 90 and 92 are input to an OR gate 96, the output of which is the output of the circuit 82.

The second circuit 102 includes two AND gates 104 and 106, each AND gate 104 and 106 adapted to receive as its inputs a source available signal, SA(i), and a corresponding enable destination signal, Enable$_{OUT}$(i), for i=0 and 1, respectively. A NOR gate 108 receives the two enable destination signals, Enable$_{OUT}$(0) and Enable$_{OUT}$(1), and the output of the NOR gate 108 and the AND gates 104 and 106 are input to an OR gate 110, the output of which is the output of the circuit 102.

In general, a Type 4 control circuit designed in accordance with the present teachings implements the following equation:

$$\text{Operate} = \Sigma[(DA(j) + \text{Enable}_{IN}(j)) \& \Sigma(SA(i) + \text{Enable}_{OUT}(i))] \quad [4]$$

Figure 7:
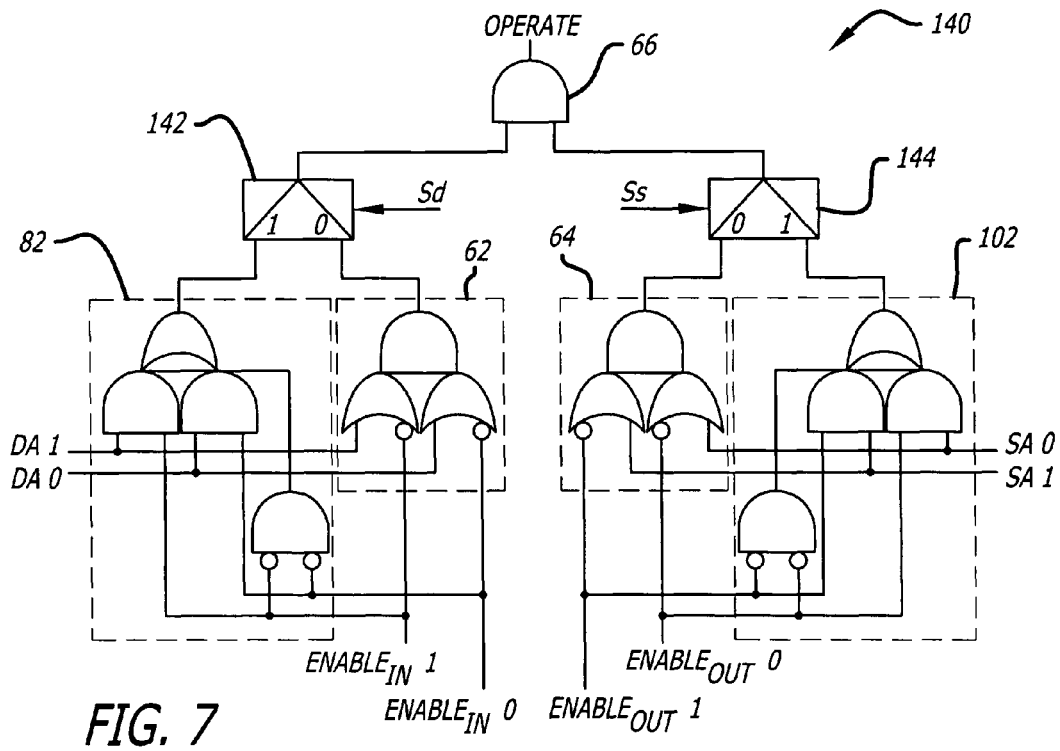
FIG. 7 is a simplified schematic of an illustrative data flow controller designed in accordance with the teachings of the present invention.

In a preferred implementation of the invention, element data flow controllers can be programmably configured to execute any one of the four control types described above. FIG. 7 is a simplified schematic of an illustrative data flow controller 140 designed in accordance with the teachings of the present invention. The data flow controller 140 can be configured to use any of the four control types, using control signals Sd (for selecting the DA response) and Ss (for selecting the SA response). Note that Sd and Ss may either be statically set upon chip configuration or dynamically set from the local FSM.

For simplicity, the illustrative circuit 140 shows control logic for an element with two destination data paths and two source data paths. The present teachings, however, may be applied to elements having more or less source and/or destination data paths.

The control circuit 140 includes a switch 142 adapted to receive the control signal Sd and in accordance therewith select either a circuit 62 for determining if all selected DA signals are asserted or a circuit 82 for determining if any selected DA signal is asserted. The circuit 62 can be implemented as shown in FIGS. 3 and 5. The circuit 82 can be implemented as shown in FIGS. 4 and 6.

The control circuit 140 also includes a switch 144 adapted to receive the control signal Ss and in accordance therewith select either a circuit 64 for determining if all selected DA signals are asserted or a circuit 102 for determining if any selected DA signal is asserted. The circuit 64 can be implemented as shown in FIGS. 3 and 4. The circuit 102 can be implemented as shown in FIGS. 5 and 6.

As shown in the example of FIG. 7, if the control signal Sd=0, then the circuit 62 is selected (operate if all selected DA signals are asserted). If the control signal Sd=1, then the circuit 82 is selected (operate if any selected DA signal is asserted). Similarly, if the control signal Ss=0, then the circuit 64 is selected (operate if all selected DA signals are asserted). If the control signal Ss=1, then the circuit 102 is selected (operate if any selected DA signal is asserted). Thus, for this example, the control signals are set to (Sd, Ss)=(0,0) to implement control type 1; (Sd, Ss)=(0,1) to implement control type 2; (Sd, Ss)=(1,0) to implement control type 3, and (Sd, Ss)=(1,1) to implement control type 4.

Thus, the teachings of the present invention provide a data flow control system offering more flexibility in determining when an operation is performed. In addition, the present teachings also provide a method for using the data flow controls to determine the type of operation to be performed, as well as the time that it is executed.

In accordance with conventional teachings, the data flow control signals (i.e., SA(i) and DAN(j)) affect only when an operation occurs, not what operation. (What operation is usually determined by the state of the FSM and external instruction bits at the point in time when the data flow controls enable an operation.) This is necessarily so, because there is only a single state of the data flow controls for which an operation occurs (i.e., if all selected DA signals are asserted and all the selected SA signals are asserted).

When control types 2, 3, and 4 of the present teachings are employed, it is possible to convey information in the data flow signals as to what operation to do, as well as when. In control types 2 and 4, (where operation depends on any DA being asserted), different operations may be programmed, depending on which DA inputs are asserted when at least one is asserted. In control types 3 and 4, (where operation depends on any SA being asserted), different operations may be programmed, depending on which SA inputs are asserted when at least one is asserted.

Figure 8:
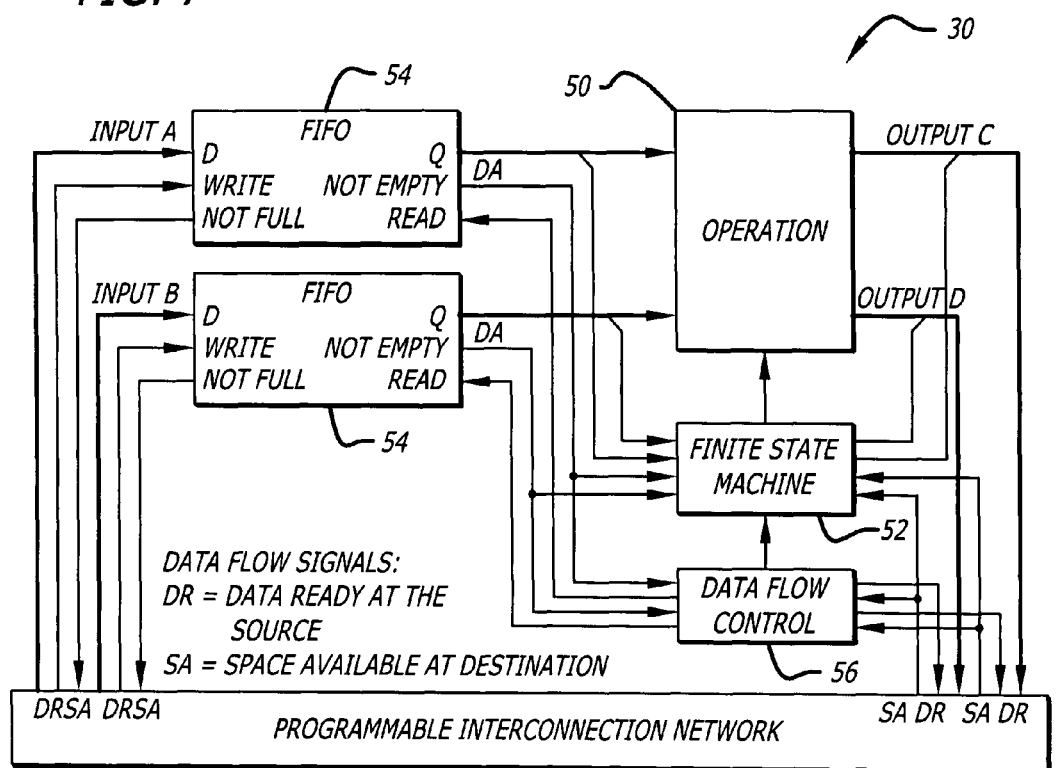
FIG. 8 is a simplified block diagram of an illustrative example of a configurable element designed in accordance with the present teachings.

FIG. 8 is a simplified block diagram of an illustrative example of a configurable element 30 designed in accordance with the present teachings. The illustrative element 30 includes an operational element 50 controlled by a finite state machine (FSM) 52, and a FIFO (first in, first out) register 54 at each input to the element 50 (two inputs A and B are shown in FIG. 8). Data flow control logic 56, designed in accordance with the present teachings, outputs a control signal to the FSM 52. In a preferred embodiment, the data flow controller 56 is implemented using the circuit 140 shown in FIG. 7, such that one of a plurality of operating conditions (control types 1-4, as described above) can be selected.

In accordance with the present teachings, the data flow control signals (DA signals from the FIFOs 54 and SA signals from the programmable interconnection network 40) are routed to both the FSM 52 as well as the data flow controller 56. The FSM 52 can then be configured to use information on which DA signals and SA signals are asserted to determine which operation the operational element 50 should perform.

Figure 9:
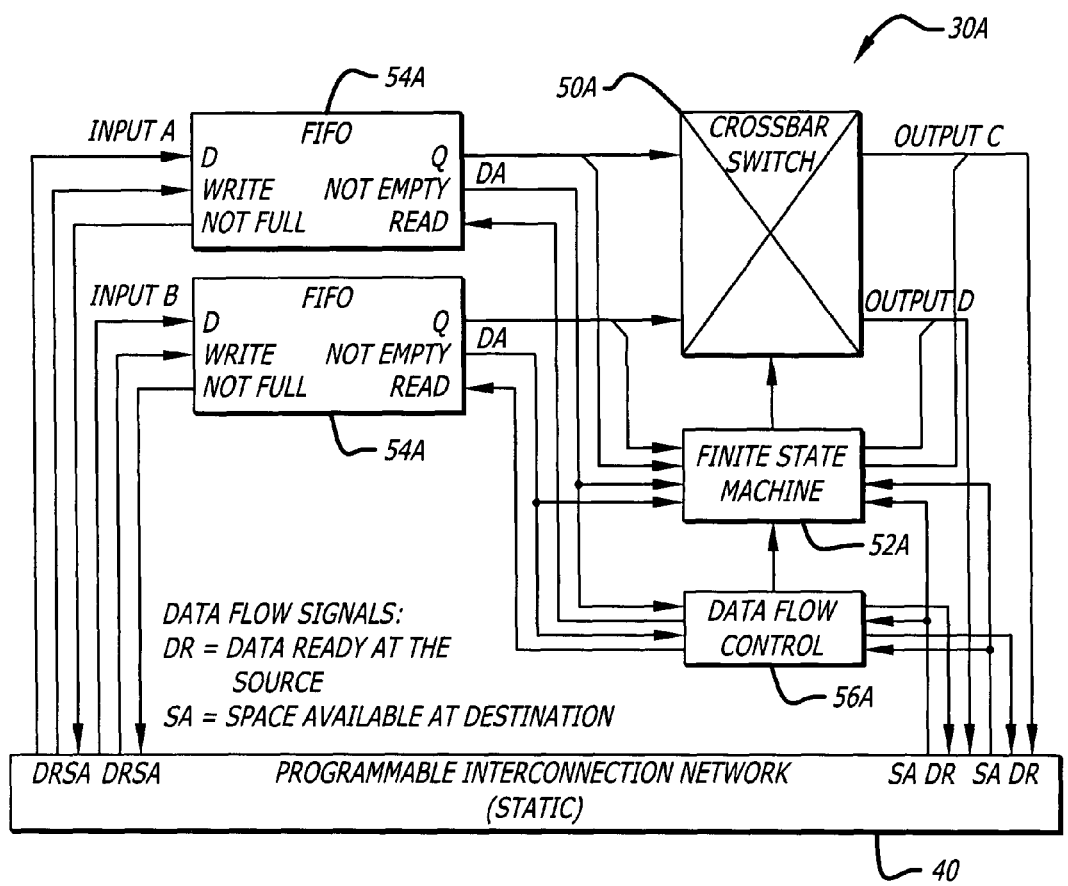
FIG. 9 is a simplified block diagram of an illustrative dynamic switch element designed in accordance with the present teachings.

The teachings of the present invention also provides for efficient dynamic switching by defining a special element, whose sole purpose is dynamic switching and flow control. FIG. 9 is a simplified block diagram of an illustrative dynamic switch element 30A designed in accordance with the present teachings. The "dynamic switch element" (DSE) 30A includes an N-input, M-output crossbar 50A whose setting is controlled directly by its element FSM 52A. The sizes of N and M, and the quantity of dynamic switching elements used on the RC, depend on the needs of the intended applications (N=2, M=2 in the example shown). An illustrative implementation might have N=4, M=4, and have the number of DSEs in the RC system to be around ⅓ of the total number of elements on the RC chip.

In a preferred embodiment, the DSE 30A includes a data flow control architecture having the attributes discussed above, including a data flow controller 56A adapted to select one of a plurality of operating conditions (control types 1-4, described above), and data flow control signals (DA signals from FIFOs 54A and SA signals from the programmable interconnection network 40) routed to both the FSM 52A as well as the data flow controller 56A.

The programmable interconnection network 40 is entirely static (that is, configured once, at chip initialization), and data paths that are to be dynamically switched in any target application are statically routed through DSE elements during the initial configuration. In operation, dynamic switching takes place in the DSE elements. Switch settings are via the programmable FSM (statically configured at initialization), which is dynamically responsive to control bits and data flow controls from all of the data ports.

The use of DSEs for dynamic switching offers the following advantages over conventional approaches:
1) More efficient (smaller, faster, and less power) than a fully dynamic programmable interconnection network.
2) More capable than the use of elements that share a small amount of switching capability with other functions.
3) More efficient than the use of elements that share switching capability with other functions.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A configurable element for a reconfigurable computer configured in a distributed control, data flow architecture, the configurable element comprising:
an operational element configured to perform a plurality of different logical operations on data;
a finite state machine adapted to configure the operational element to perform a selected logical operation of the plurality of different logical operations and output a plurality of first control signals, in accordance with an input/output condition;
a data flow controller comprising:
first means for selecting one of a plurality of input/output conditions in accordance with the plurality of first control signals from the finite state machine, the input/output conditions indicating availability of input data to the operational element and availability of spaces for receiving output data from the operational element;
second means for determining if the selected input/output condition is satisfied and for outputting a second control signal to the finite state machine for controlling the operational element to perform said selected logical operation on the data, when the selected input/output condition is satisfied;
a first circuit for determining if all selected input signals are asserted;
a second circuit for determining if any selected input signal is asserted;
a first switch for receiving one or more of the first control signals and selecting the first circuit or the second circuit based on said received first control signals;
a third circuit for determining if all selected output conditions are asserted;
a fourth circuit for determining if any selected output condition is asserted;
a second switch for receiving one or more of the first control signals and selecting the third circuit or the fourth circuit based on said received first control signals;
wherein the data flow controller causes the finite state machine to control the operational element to perform:
a first selected logical operation, when all selected input signals are asserted and all selected output conditions are asserted,
a second selected logical operation, when any selected input signal is asserted and all selected output conditions are asserted,
a third selected logical operation, when all selected input signals are asserted and any selected output conditions is asserted, and
a fourth selected logical operation, when any selected input signal is asserted and any selected output conditions is asserted; and
a programmable interconnection network for routing control signals to the finite state machine and the data flow controller, wherein
the configurable element does not have a program counter.

2. The invention of claim 1 wherein one of said operating conditions includes when all enabled data available signals are asserted and all enabled space available signals are asserted.

3. The invention of claim 1 wherein one of said operating conditions includes when any enabled data available signal is asserted and all enabled space available signals are asserted.

4. The invention of claim 1 wherein one of said operating conditions includes when all enabled data available signals are asserted and any enabled space available signal is asserted.

5. The invention of claim 1 wherein one of said operating conditions includes when any enabled data available signal is asserted and any enabled space available signal is asserted.

6. The invention of claim 1 wherein said first means includes means for selecting one of a plurality of conditions for data available signals.

7. The invention of claim 6 wherein one of said conditions for data available signals includes when all enabled data available signals are asserted.

8. The invention of claim 6 wherein one of said conditions for data available signals includes when any enabled data available signal is asserted.

9. The invention of claim 1 wherein said first means includes means for selecting one of a plurality of conditions for space available signals.

10. The invention of claim 9 wherein one of said conditions for space available signals includes when all enabled space available signals are asserted.

11. The invention of claim 9 wherein one of said conditions for space available signals includes when any enabled space available signal is asserted.

12. A configurable element for a reconfigurable computer configured in a distributed control, data flow architecture, the configurable element comprising:
an operational element configurable to perform a plurality of different logical operations on data;
a finite state machine adapted to configure the operational element to perform a selected logical operation of the plurality of different logical operations and output a first control signal and a second control signal; and
a data flow controller comprising:
a first circuit for receiving and determining if all selected signals of the data flow signals are asserted;
a second circuit for receiving and determining if any selected signal of the data flow signals is asserted;
a first switching circuit adapted to receive the first control signal from the finite state machine and in accordance therewith select the output of said first circuit or the output of said second circuit;
a third circuit for receiving and determining if all selected output conditions of the data flow signals are asserted;
a fourth circuit for receiving and determining if any selected output conditions of the data flow signals is asserted;

a second switching circuit adapted to receive the second control signal from the finite state machine and in accordance therewith select an output of said third circuit or an output of said fourth circuit;

a fifth circuit adapted to receive the output of said first switching circuit and the output of said second switching circuit and in accordance therewith output a third control signal to the finite state machine for configuring the configurable element to perform the selected logical operation, wherein each of the enabled data available signals indicates availability of input data to the operational element and each of the enabled space available signals indicates availability of a space for receiving output data from the operational element, and wherein the data flow controller causes the finite state machine to configure the operational element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted; and a programmable interconnection network for routing control signals to the finite state machine and the data flow controller, wherein the configurable element does not have a program counter.

13. A configurable element for a reconfigurable computer configured in a distributed control, data flow architecture, the configurable element comprising:

an operational element configurable to perform a plurality of different logical operations on data;

a finite state machine adapted to configure the operational element to perform a selected logical operation of the plurality of different logical operations and output a first control signal and a second control signal; and a data flow controller comprising:

a first circuit and a second circuit for selecting one of a plurality of operating conditions that determines the selected logical operation to be performed by the operational element, the first circuit for receiving and determining if all or any selected signal of the data flow signals is asserted in accordance with the first control signal received from the finite state machine, the second circuit for receiving and determining if all or any enabled space available signals of the data flow signals are asserted in accordance with the second control signal received from the finite state machine; and a third circuit adapted to receive outputs from said first and second circuits to determine if the selected operating condition is met and in accordance therewith output a third control signal to the finite state machine for controlling the operational element to perform the selected logical operation, wherein the first and second circuits are adapted to select the operating condition prior to the third circuit being utilized to determine if the selected operating condition is met, and wherein each of the enabled data available signal indicates availability of selected input data to the operational element and each of the enabled space available signals indicates availability of a space for receiving output data from the operational element, and wherein the data flow controller causes the finite state machine to configure the operational element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted; and a programmable interconnection network for routing control signals to the finite state machine and the data flow controller, wherein the configurable element does not have a program counter.

14. A reconfigurable computer configured in a distributed control, data flow architecture, comprising:

configuration registers;

a plurality of elements; and a programmable interconnection network adapted to connect said elements in accordance with configuration settings stored in said configuration registers, wherein each element includes an operational element configurable to perform a plurality of different logical operations on data, a finite state machine adapted to configure the operational element to perform a selected logical operation of the plurality of different logical operations and output a plurality of first control signals, and a data flow controller adapted to receive the data flow signals and select one of a plurality of operating conditions in accordance with the first control signals received from the finite state machine and the data flow signals, and if the selected operating condition is met, the data flow controller is adapted to output a second control signal to the finite state machine indicating said operational element should perform the selected logical operation in accordance with the selected operating condition, wherein the data flow controller is adapted to select the operating condition prior to generating the second control signal, and wherein the plurality of operating conditions indicate availability of input data to the operational element and availability of a space for receiving output data from the operational element, and wherein the data flow controller causes the finite state machine to configure the operational element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted; and a programmable interconnection network for routing control signals to the finite state machine and the data flow controller, wherein the configurable element does not have a program counter.

15. A reconfigurable computer configured in a distributed control, data flow architecture, comprising:

configuration registers;

a plurality of elements; and a programmable interconnection network adapted to connect said elements in accordance with configuration settings stored in said configuration registers, wherein each element includes an operational element configurable to perform a plurality of different logical operations on data, a finite state machine adapted to configure the operational element to perform a selected logical operation of the plurality of different logical operations and to output a plurality of first control signals, and a control circuit adapted to select one of a plurality of operating conditions in accordance with the plurality of first control signals received from the finite state machine and receive the data flow signals and in accordance therewith output a second control signal to the finite state machine for controlling said operational element to perform the selected logical operation in accordance with the selected operating condition, wherein the control circuit is adapted to select the operating condition prior to controlling said operational element to perform the operation, and wherein the data flow signals indicate availability of input data to the operational element and availability of spaces for receiving output data from the operational element, and wherein the the data flow controller causes the finite state machine to configure the operational element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted; and a programmable interconnection network for routing control signals to the finite state machine and the data flow controller, wherein the configurable element does not have a program counter.

16. The invention of claim 15 wherein said data flow signals include data available signals.

17. The invention of claim 15 wherein said data flow signals include space available signals.

18. The invention of claim 15 wherein the control circuit includes a data flow controller adapted to receive said data flow signals and in accordance therewith control when said operational element performs the operation.

19. The invention of claim 18 wherein one of said operating conditions includes when all enabled data available signals are asserted and all enabled space available signals are asserted.

20. The invention of claim 18 wherein one of said operating conditions includes when any enabled data available signal is asserted and all enabled space available signals are asserted.

21. The invention of claim 18 wherein one of said operating conditions includes when all enabled data available signals are asserted and any enabled space available signal is asserted.

22. The invention of claim 18 wherein one of said operating conditions includes when any enabled data available signal is asserted and any enabled space available signal is asserted.

23. A method for data flow control in a reconfigurable computer configured in a distributed control, data flow architecture, comprising a configurable element, a control circuit, and a finite state machine for controlling the configurable element, the method including the steps of:

operating the finite state machine to configure the configurable element to perform a selected logical operation of a plurality of different logical operations on the data and output a plurality of first control signals;

operating the control circuit to receive the data flow signals and selecting one of a plurality of operating conditions in accordance with the plurality of first control signals received from the finite state machine and the data flow signals, the operating conditions indicating availability of input data to the configurable element and availability of spaces for receiving output data from the configurable element; and operating the control circuit to generate a second control signal indicating the selected logical operation should be performed if the selected operating condition is met, the second control signal being received by the finite state machine, wherein the data flow controller causes the finite state machine to configure the configurable element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted, wherein the configurable element does not have a program counter.

24. A method for controlling an element in a reconfigurable computer configured in a distributed control, data flow architecture, the element comprising a finite state machine and a control circuit, the method including the steps of:

operating the finite state machine to receive data flow signals and configure said element to perform a selected logical operation of a plurality of different logical operations on the data and output a plurality of first control signals, if any enabled data available signals of the data flow signals are asserted and/or any enabled space available signals of the data flow signals are asserted, and operating the control circuit to receive the data flow signals in accordance with the first control signals to output a second control signal to the finite state machine, the second control signal indicating when the selected logical operation is performed by the element using information on which of the data available signals and/or the space available signals are asserted, wherein each of the enabled data available signals indicates availability of input data to the element and each of the enabled space available signals indicates availability of a space for receiving output data from the element, and wherein the data flow controller causes the finite state machine to configure said element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted, wherein the configurable element does not have a program counter.

25. A method for providing dynamic switching in a reconfigurable computer configured in a distributed control, data flow architecture, the method including the steps of:

providing a plurality of elements, wherein one or more of said elements is a dynamic switch element dedicated solely for dynamic switching and flow control; and connecting said elements using a static programmable interconnection network, wherein the dynamic switch element comprises:

a finite state machine adapted to configure the dynamic switch element to perform a selected logical operation of a plurality of different logical operations on the data and to output a plurality of first control signals; and a data flow controller adapted to receive the data flow signals and select one of a plurality of operating conditions in accordance with the plurality of first control signals received from the finite state machine and the data flow signals, the operating conditions indicating availability of input data to the dynamic switch element and availability of spaces for receiving output data from the dynamic switch element, wherein the data flow controller is adapted to select one of the plurality of operating conditions prior to the input data being available and output a second control signal to the finite state machine for operating the dynamic switch element to perform the selected logical operation in accordance with the selected operating condition, and wherein the data flow controller causes the finite state machine to configure the dynamic switch element to perform:

a first selected logical operation, when all selected input signals are asserted and all selected output conditions are asserted, a second selected logical operation, when any selected input signal is asserted and all selected output conditions are asserted, a third selected logical operation, when all selected input signals are asserted and any selected output conditions is asserted, and a fourth selected logical operation, when any selected input signal is asserted and any selected output conditions is asserted, wherein the configurable element does not have a program counter.

* * * * *